Figure 1:
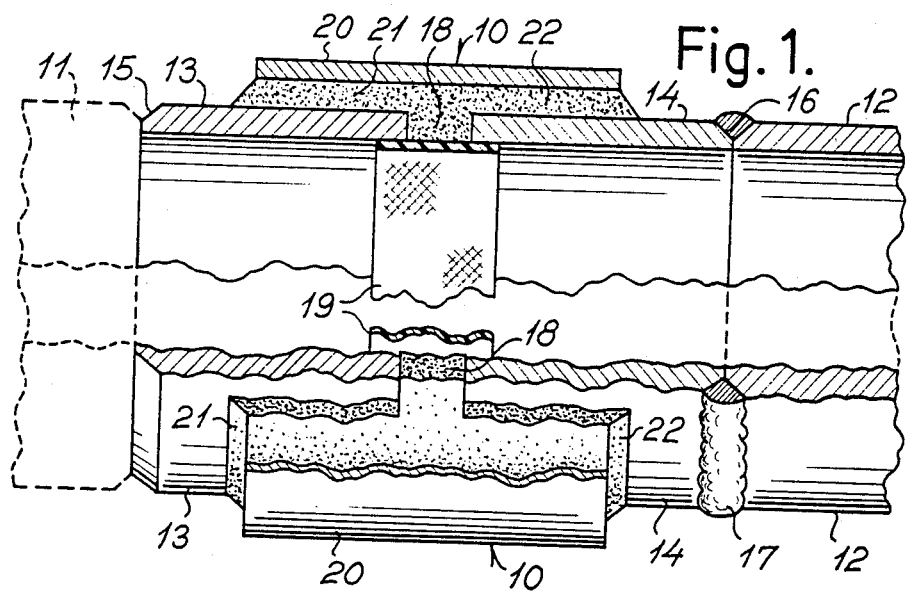

United States Patent [19]

Arup

[11] Patent Number: 4,515,861

[45] Date of Patent: May 7, 1985

[54] ARTICLES PROTECTED AGAINST CORROSION AND METHODS FOR PROTECTING ARTICLES AGAINST CORROSION

[75] Inventor: Hans Arup, Lyngby, Denmark

[73] Assignee: Aktieselskabet Aalborg Portland-Cement-Fabrik, Aalborg, Denmark

[21] Appl. No.: 359,658

[22] PCT Filed: Jul. 8, 1981

[86] PCT No.: PCT/DK81/00069

§ 371 Date: Mar. 5, 1982

§ 102(e) Date: Mar. 5, 1982

[87] PCT Pub. No.: WO82/00302

PCT Pub. Date: Feb. 4, 1982

[30] Foreign Application Priority Data

Jul. 11, 1980 [DK] Denmark .................. 3030/80

[51] Int. Cl.³ .............................................. C23F 15/00
[52] U.S. Cl. ........................................ 428/450; 106/90; 106/98; 427/201; 427/202; 427/204; 428/689; 428/703
[58] Field of Search ............... 428/703, 689, 450; 106/90, 98; 427/201, 202, 204

[56] References Cited

U.S. PATENT DOCUMENTS

| | | | |
|---|---|---|---|
| 2,890,157 | 6/1959 | Raetzsch | 204/196 |
| 3,676,541 | 7/1972 | Mishi et al. | 106/90 |
| 4,028,125 | 6/1977 | Martin | 106/90 |
| 4,036,659 | 7/1977 | Stude | 106/90 |
| 4,255,241 | 3/1981 | Kroon et al. | 204/196 |
| 4,310,486 | 1/1982 | Cornwell et al. | 106/98 |

Primary Examiner—John E. Kittle

Attorney, Agent, or Firm—Hubbell, Cohen, Stiefel & Gross

[57] ABSTRACT

Steel articles are protected against corrosion by being completely or partially coated with a material showing a resistivity of at least 0.1 MΩ.cm and comprising a matrix which comprises (A) inorganic solid particles of a size of from about 50 Å to about 0.5 μm, or a coherent structure formed from such homogeneously arranged particles, and (B) densely packed solid particles having a size of the order of 0.5-100 μm and being at least one order of magnitude larger than the respective particles stated under (A), or a coherent structure formed from such densely packed particles, the particles B preferably being Portland cement particles.

Particles A are preferably ultrafine silica particles formed by growth from vapor phase and are substantially densely packed in the voids between the particles B. Particles A are especially present in an amount of 10-30% by volume, calculated on the combined volume of the particles A+B. Composite material for forming the matrix typically comprises Portland cement, ultrafine silica, water in low proportion, and a concrete superplasticizer in high proportion, optionally with additional bodies such as fibers or mica, and is easily shapeable and also suitable for underwater application. Resistivity of the coating material is in the range of 0.3-10 MΩ.cm, typically at least 1 MΩ.cm. Development of resistivity accelerates when curing is performed at elevated temperature.

Steel article may, e.g., be one in which the steel receives cathodic protection, or a pipe connector (10) which comprises a pair of axially spaced tubular bodies (11, 12) interconnected by said coating material (22).

6 Claims, 4 Drawing Figures

ARTICLES PROTECTED AGAINST CORROSION AND METHODS FOR PROTECTING ARTICLES AGAINST CORROSION

The present invention relates to novel articles and methods based upon new discoveries of particularly surprising properties possessed by materials comprising special binder matrices disclosed in International patent application No. PCT/DK79/00047, further developments of the special binder matrices being disclosed in International patent application No. PCT/DK81/00048, the contents of the above-mentioned patent applications being incorporated herein by reference.

BACKGROUND AND DEFINITIONS

In the following specification and claims, the term "DSP matrix" designates any coherent binder matrix disclosed in the above-mentioned patent applications and comprising (A) homogeneously arranged inorganic solid particles of a size of from about 50 Å to about 0.5 µm, or a coherent structure formed from such homogeneously arranged particles, and (B) densely packed solid particles having a size of the order of 0.5-100 µm and being at least one order of magnitude larger than the respective particles stated under (A), or a coherent structure formed from such densely packed particles, the particles A or the coherent structure formed therefrom being homogeneously distributed in the void volume between the particles B, the dense packing being substantially a packing corresponding to the one obtainable by gentle mechanical influence on a system of geometrically equally shaped large particles in which locking surface forces do not have any significant effect,
the matrix optionally additionally comprising, embedded therein, (C) compact-shaped solid particles of a material having a strength exceeding that of ordinary sand and stone used for ordinary concrete, typically a strength corresponding to at least one of the following criteria:

(1) a die pressure of above 30 MPa at a degree of packing of 0.70, above 50 MPa at a degree of packing of 0.75, and above 90 MPa at a degree of packing of 0.80, as assessed (on particles of the material having a size ratio between the largest and smallest particle substantially not exceeding 4) by the method described in International patent application No. PCT/DK81/00048, (2) a compressive strength of a composite material with the particles embedded in a specified matrix exceeding 170 MPa (in case of a substantial amount of the particles being larger than 4 mm) and 200 MPa (in case of substantially all particles being smaller than 4 mm), as assessed by the method described in International patent application No. PCT/DK81/00048, (3) a Moh's hardness (referring to the mineral constituting the particles) exceeding 7 and (4) a Knoop indentor hardness (referring to the mineral constituting the particles) exceeding 800, said particles having a size of 100 µm–0.1 m,
and the matrix further optionally containing, embedded therein, (D) additional bodies which have at least one dimension which is at least one order of magnitude larger than the particles A.

The additional bodies termed "D" above are the same bodies as are designated "bodies C" in International patent application No. PCT/DK81/00048. They comprise a wide variety of bodies, including particles such as sand or stone and fibers such as, e.g., glass fibers, steel fibers, and plastics fibers. Particularly strong shaped articles comprising the DSP matrix are obtained when bodies C which have a strength exceeding that of ordinary sand and stone used for ordinary concrete are embedded in the matrix. Typical examples of bodies C are bodies consisting of one or more of the following components: Topaz, lawsonite, diamond, corundum, phenacite, spinel, beryl, chrysoberyl, tourmaline, granite, andalusite, staurolite, zircon, boron carbide, tungsten carbide; one interesting and economical material being refractory grade bauxite.

In the following specification and claims, the term "a material comprising the DSP matrix" designates any material having the new matrix as a binder matrix and optionally containing bodies C and D as defined above. As discussed in International patent application No. PCT/DK79/00047 and International patent application No. PCT/DK81/00048, the particles B will, according to important embodiments, comprise at least 20% of Portland cement particles, preferably predominantly Portland cement particles, and the particles A may, according to important embodiments, comprise ultrafine silica particles ("silica dust") having a specific surface area of about 50,000–2,000,000 $cm^2/g$, preferably about 250,000 $cm^2/g$, and preferred ultrafine silica particles are particles which are formed by growth from liquid or preferably vapour phase such as particles formed as a by-product in the production of silicon metal or ferrosilicium in electrical furnaces. As described in the above-mentioned patent applications, articles comprising the DSP matrix may be made from an easily flowable composite material of an extremely low liquid content by shaping in a low stress field. In the following specification and claims, the term "composite material" designates any composite material which, on curing, forms a material comprising the DSP matrix. These composite materials are described in greater detail in the above-mentioned patent applications. The composite material containing Portland cement particles as particles B comprises a high amount of a dispersing agent, typically a concrete superplasticizer, and examples of useful concrete superplasticizers are given in the above-mentioned patent applications. The methods and materials for producing, casting and further treating the DSP matrix as disclosed in the above-mentioned patent applications are also used for producing the new matrix in the context of the present application.

In the following specification and claims, the term "densely packed" is to be understood in accordance with the definition of "dense packing" given above.

DESCRIPTION OF THE PRESENT INVENTION

According to the present invention, it has been found that the pastes, mortars and concretes incorporating the DSP matrix, in particular when the composite material for preparing the material comprising the DSP matrix shows a very low ratio of liquid to particles A and B, such as a ratio in the range of 0.08–0.20, e.g., 0.12–0.20 and in particular when the matrix shows, correspondingly, a packing of particles A which is or approaches dense packing, that is, when the particles A are present in a volume of 5–50% by volume, especially 10–30% by volume, have an extremely high electrical resistivity which is at least two orders of magnitude and typically 2-4 orders of magnitude (powers of 10) higher than the electrical resistivity of ordinary cement mortars, which typically have a resistivity around 3000 Ω.cm. Thus, electrical resistivities obtainable in the materials comprising the new matrices are in the range of 0.1-30 MΩ.cm, usually in the range of 0.3-10 MΩ.cm, typically at least 1 MΩ.cm.

It has been found that the resistivity of the DSP matrix can be further increased if curing of the matrix is performed at an elevated temperature, e.g., at 80° C. Hence, an interesting embodiment of the invention comprises performing the curing of the DSP material at elevated temperature, e.g., in the range of 30°-250° C., including autoclave curing at 212° C. Already curing at 30° C. considerably accelerates the development of high resistivity.

The high resistivity of the DSP matrix is a most valuable property with respect to the corrosion-protection of metals covered by or embedded in the DSP materials. The high resistivity of the materials comprising the DSP matrix is believed to be due to the fact that the small amount of water used in mixing for preparing the DSP matrix is virtually completely consumed in the hardening process and that the hardened structure is so dense that the material is nearly impermeable to water, so that the final hardened structure contains virtually no water. Thus, the DSP matrix is extremely dense, like porcelain, and its water absorption is nearly nil. Correspondingly, the diffusion rates of oxygen or chlorides in the DSP matrix are contemplated to be very small.

In spite of the above-mentioned extreme density of the new matrix and its freedom from water in cured state, the composite material forming the material comprising the DSP matrix is surprisingly fluid before curing. It runs almost like a liquid and will fill narrow cracks and long voids. In casting under water, it has very little tendency to disperse. It can be poured through water to fill the voids in prepacked aggregate.

When the DSP matrix is prepared with Portland cement particles as particles B, materials based on this matrix are able to protect steel against corrosion by the same mechanism as ordinary cement mortars and concrete. In such materials, steel is normally protected by the passivity caused by the alkaline reaction of the cement-containing materials. However, materials prepared with the DSP matrix have the above-mentioned much higher electrical resistivity and much lower permeability than ordinary cement mortars and concrete.

This combination of properties makes the material comprising the DSP matrix, especially when containing Portland cement particles as particles B, a most valuable material for protection of steel, for underwater repairs, for grouted joints in offshore steel platforms, and as replacement for concrete in some applications, e.g. in electrolytic plants, where stray-current corrosion of steel reinforcement has been a problem.

Hence, one aspect of the present invention comprises a steel article protected against corrosion by being completely or partially coated with a material showing a resistivity of at least 0.1 MΩ.cm and comprising the DSP matrix (as defined above) wherein the particles A (as defined above) are substantially densely packed in the voids between the particles B (as defined above) which normally means that the particles A are present in a volume of 5-50% by volume, preferably 10-30% by volume, calculated on the combined volume of the particles A+B. The above term "coated with" also includes the case where the steel article or part thereof is embedded in a mass of the material comprising the DSP matrix.

In accordance with the above explanation, the particles B in the article of the invention preferably comprise Portland cement particles conferring corrosion protection to the steel due to the alkaline nature of the hardened Portland cement. For most applications, it is preferred that the particles B comprise at least 20% of Portland cement particles, more preferably at least 50% of Portland cement particles, and often, the most preferred version of the material comprising the DSP matrix will be one where the particles B are constituted substantially completely by Portland cement particles. The particles A are preferably ultrafine silica particles formed by growth from a liquid phase or preferably from vapour phase such as the above-mentioned silica particles formed as a by-product in the production of ferrosilicium or silicon metal in electrical furnaces and being of a size in the range from about 50 Å to about 0.5 μm, typically in the range from about 200 Å to about 0.5 μm. It is preferred that the resistivity of the material comprising the DSP matrix is at least 0.3 MΩ.cm, preferably in the range of 1-10 MΩ.cm.

When the material comprising the DSP matrix is used for protection of steel, e.g., as a protective cover on exposed steel in existing steel-reinforced concrete structures to be surface-protected or repaired, the high resistivity of the the DSP matrix suppresses the formation of galvanic elements between different parts of the protected surface or between the protected surface and other areas of metals in glavanic contact with the protected metal, thus suppressing any galvanically enhanced corrosion. By comparison, steel embedded in ordinary concrete is known to exert a strong galvanic influence on non-embedded steel in metallic and electrolytic contact with the embedded steel. By way of example, this is known to produce strong local corrosion of reinforcement steel exposed at areas where the protective cover is spalled or cracked, especially when the structure is placed in a conductive electrolyte such as seawater.

The high resisivity of the materials comprising the DSP matrix and their protective action on metals covered thereby or embedded therein are especially valuable in any structure comprising reinforcing steel, and particularly when the material comprising the DSP matrix is used to protect pre-stressing wires or tendons in ducts or in anchor blocks or when the material comprising the new matrix is used in repairs or in filling of voids around steel in concrete, because the high resistivity minimizes any galvanic action between steel covered by the material comprising the DSP matrix and steel protected by ordinary concrete. These properties, combined with the above-mentioned suitability of the materials comprising the DSP matrix for underwater applications, make them especially attractive for underwater repair work on steel-reinforced concrete structures.

The said property is also of particular value when the material comprising the DSP matrix is used as a coating on steel structures, e.g., pipes and tanks, including cathodically protected steel structures, as the high resistivity of the DSP matrix not only prevents galvanic action at any uncoated areas, but also reduces the amount of current needed when cathodic protection is applied.

In this context, the high alkali resistance of the DSP matrix is particularly valuable because the current used in cathodic protection produces hydroxyl ions at the surface of bare steel, and the alkaline surroundings are known to cause degradation of many organic coatings ordinarily used for protection of steel under these circumstances. The DSP material is very resistant to attack by alkali produced at bare spots and will not give rise to accelerated corrosion at bare spots left unprotected. Hence, materials comprising the DSP matrix used as a coating for steel, especially steel which receives cathodic protection in a manner known per se by being in galvanic contact with sacrificial anode material or by an impressed current, in particular steel in seawater, soil, and other electrolytes, may replace customarily used coating materials such as organic polymers, coal tars, and asphalts which, in comparison, may be more expensive, more easily degradable, or environmentally objectionable.

Hence, novel articles of the present invetion comprise steel structures such as tanks, tubes, pipes, bridges, towers, offshore steel structures, including riser pipes, and reinforcement steel covered with a protective coating of a material comprising the DSP matrix. Other specific steel articles protected with the material comprising the DSP matrix are mentioned in the claims. For protecting steel articles against corrosion in accordance with the principles of the present invention, this use, the composite material in the fluid state will be applied directly on the steel surface by brushing, dipping, spraying, or any other suitable method useful for applying a layer of the desired thickness, or for completely surrounding or embedding the steel article. Typical thicknesses of protective layers on steel are in the range of 0.1–50 mm, in particular 2–20 mm, the thickness of the layer being dependent upon, inter alia, the mechanical influences to which the protected steel article will be subjected. The mechanical properties of the applied coating may be improved by the incorporation of fibers, flakes, or other reinforcing bodies of the types described in the above-mentioned patent applications. The inclusion of flake materials such as glass flakes, mica, or stainless steel may be particularly useful for increasing the chemical resistance and the diffusion resistance of the coatings. Glass flakes and mica contribute to further increase the electrical resistivity of the protective coatings.

In accordance with this, the invention also relates to a method for protecting a steel article against corrosion, comprising applying a DSP material to the surface of the steel article or part thereof in such a manner that direct contact is established between the surface of the article and the DSP material. According to the invention, this may be obtained by applying a fluid composite material which comprises (A) inorganic particles of a size of from about 50 Å to about 0.5 μm, (B) solid particles having a size of the order of 0.5–100 μm, and being at least one order of magnitude larger than the respective particles stated under (A), in particular Portland cement particles, and optionally bodies C and/or D as defined above, a liquid, and a surface-active dispersing agent, the amount of particles B substantially corresponding to dense packing thereof in the composite material with homogeneously and substantially densely packed particles A in the voids between particles B, the amount of liquid substantially corresponding to the amount necessary to fill the voids between particles A and B, and the amount of dispersing agent being sufficient to impart to the composite material a fluid to plastic consistency in a low stress field of less than 5 kg/cm$^2$, preferably less than 100 g/cm$^2$, said composite material being capable of forming, on curing, a coating or embedding mass of a material comprising the DSP matrix and having a resistivity of at least 0.1 MΩ.cm, if necessary conforming the composite material to the shape of the surface, and allowing the composite material to cure to form the material comprising the new matrix.

As mentioned above, the particles A and the liquid are present in the composite material in a volume resulting in substantially dense packing of the particles A in the voids between the densely packed particles B in the DSP matrix, the particles A preferably being present in a volume of 5–50% by volume, more preferably 10–30% by volume, of the combined volume of the particles A+B. In accordance with the above discussion, it is preferred that the composite material comprises Portland cement as particles B and ultra fine silica particles as defined above as particles A. Hence, the composite material will preferably comprise Portland cement, ultra fine silica particles, water, a concrete superplasticizer, and optionally bodies C and/or D. In order to obtain the substantially dense packing in the DSP matrix, the weight ratio of the water to the Portland cement particles and any other particles B plus the silica dust particles A is preferably in the extremely low range of 0.12 to 0.20. The dispersing agent is used in amount sufficient to allow substantially dense packing of the particles A between densely packed particles B in a low stress field. As explained in detail in the above-mentioned patent applications, this is normally an amount which exceeds the amounts of dispersing agents conventionally used. Thus, e.g., the concrete superplasticizer Mighty used in the Example will normally be employed in an amount of 1–4% by weight, in particular 2–4% by weight, calculated on the total weight of the Portland cement and the silica dust. The curing may be performed at ambient temperature, or it may be performed at elevated temperature to increase the resistivity of the cured product, cf. what has been stated above concerning the curing temperature.

A special method of applying a protective coating of DSP is the rolling on of fiber mats or webs soaked with the fluid DSP composite material. This method is particularly useful for coating underground or underwater storage tanks. In order to obtain additional mechanical strength or additional weight of the coated article, e.g., when applied to riser pipes in offshore structures or underwater pipelines, additional layers of ordinary concrete, reinforced concrete, high density concrete, or composite materials as described in the above-mentioned patent applications can be applied.

Another possibility is to apply the material comprising the DSP matrix in the form of a sheet formed by plastic deformation. The sheet may be in cured state when applied (e.g. applied by means of fluid paste comprising the DSP matrix as a "glue"), or the sheet may be in uncured, plastic state. The sheet comprising the DSP matrix based on, e.g., Portland cement as particles B and ultrafine silica as particles A may be prepared by plastic deformation of a mass having as low a weight ratio between water and particles A and B as, e.g., 0.08, using a surface active dispersing agent in a sufficient amount to allow substantially dense packing of the particles A in voids between densely packed particles B, in accordance with the teachings of the above-mentioned patent applications.

The high electrical resistivity of the DSP matrix is also important when material comprising the matrix is used as a protective coating on ordinary concrete structures. In such cases, the coating will induce a high resistivity in the medium surrounding the reinforcement, and it will therefore suppress the galvanic elements otherwise likely to cause corrosion of reinforcement in certain parts of the structures.

The strength and dense structure of mortar and concrete comprising the DSP matrix makes it interesting as a replacement for cast iron and other cast materials in seawater applications where erosion, corrosion, and galvanic contact with other metals is a problem. For example, pumps and valves for seawater applications, especially in large dimensions, are suitably made from a material comprising the DSP matrix.

Glued anchors, e.g. of stainless steel, used for fixtures on concrete structures, normally use epoxy resin as the "glue". The properties of the DSP matrix make grout comprising the DSP matrix ideal as a replacement for the epoxy in such applications, and generally for grouting joints between prefabricated concrete members in modular constructions or other composite structures, especially if the grout is required to protect protruding steel reinforcement, tie wires or bolts used in such joints.

The material comprising the DSP matrix is also very suitable for grouting "spike and socket" connections and similar joints in both reinforced concrete structures, especially pipes, and in metallic structures, especially pipes of steel or cast iron, and socket joints in, e.g., large off-shore structures where such joints are used to eliminate the need for welding or bolting under water or in inaccessible locations.

A special and very important type of such joint is insulating pipe connectors used in cathodically protected pipelines or in other conduits or structures to divide a large system into smaller sections electrically insulated from each other. For example, such a connector for steel pipelines could consist of two short lengths of steel pipes, each adapted to be welded onto an end of a pipeline section, arranged uniaxially and separated from each other by a distance of e.g. a few cm and surrounded by a common larger diameter short tube, the interspace between the larger diameter tube and the two interior pipe lengths being filled with the material comprising the DSP matrix, and the material comprising the DSP matrix constituting the interior wall of the connecting member along the distance between two inner pipe lengths. A suitable extra measure to increase the pull out-strength of the joint would consist in welded projections on the outside of the interior pipe lengths and on the interior side of the exterior tube and protruding into the material comprising the DSP matrix.

Figure 2:
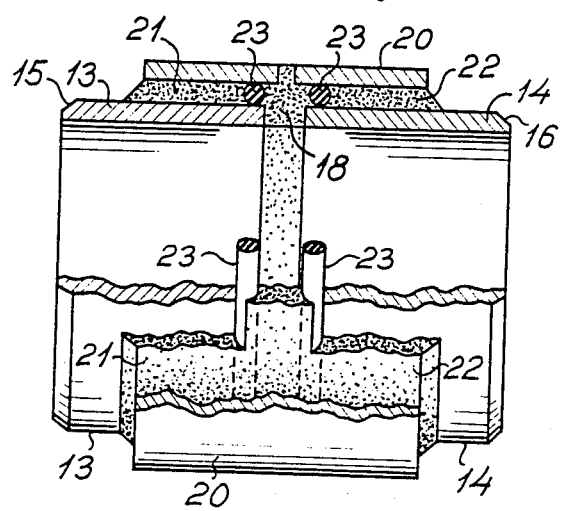
Figure 3:
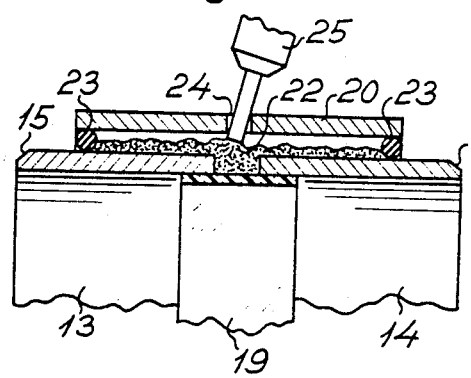
Figure 4:
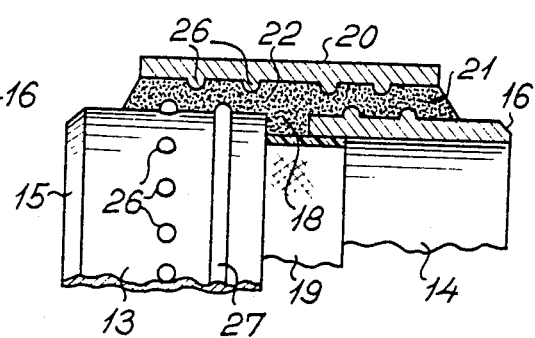

The pipe or tube connector according to the invention will now be further described with reference to the drawing, wherein FIG. 1 is a side view and partially sectional view of a first embodiment of the pipe or tube connector according to the invention, FIG. 2 is a side view and partially sectional view of a second embodiment of the pipe or tube connector according to the invention, FIG. 3 is a fragmentary sectional view illustrating the production of a third embodiment of a pipe or tube connector according to the invention, and FIG. 4 is a fragmentary side view and partially sectional view of a fourth embodiment which is a modified version of the embodiment shown in FIG. 1.

FIG. 1 shows a tube or pipe connector which is generally designated by 10, and which is used for interconnecting adjacent tube or pipe sections 11 and 12, respectively. The connecter 10 comprises a pair of aligned, axially spaced tubular bodies 13 and 14 having oppositely arranged chamfered or bevelled outer edges 15 and 16 which may be connected to the tube or pipe sections 11 and 12, e.g., by weldings 17. The spacing 18 defined between the inner ends of the tubular bodies 13 and 14 is covered by a tape or a sheet material 19 which is adhered to the inner surfaces of the tubular bodies 13 and 14, and the spacing 18 is also covered by an outer annular sleeve member 20, which surrounds the adjacent end portions of the bodies 13 and 14. The inner diameter of the sleeve member 20 exceeds the outer diameter of the tubular bodies 13 and 14 so as to define an annular space 21 between the inner surface of the sleeve member 20 and the outer surfaces of the tubular bodies 13 and 14. The spacing 18 between the tubular bodies 13 and 14, and the annular space 21 is completely filled by an intregal annular body 22 of a material comprising the DSP matrix. This body 22 interconnects the tubular bodies 13 and 14 and the annular sleeve member 20. The electrically insulating body 22 is preferably cast in situ by pouring a material comprising the DSP paste into the space 21. The tape or sheet material 19 is preferably electrically insulating. If not, it should be removed when the material comprising the DSP matrix has been cast and has hardened sufficiently.

FIGS. 2-4 show further embodiments of the tube or pipe connector, and parts corresponding to those described in connection with FIG. 1 have been designated by the same reference numerals.

In the embodiment shown in FIG. 2, the tape or sheet material 19 has been omitted, and a pair of spacer rings, such as O-rings, made from an electrically insulating material is arranged on the outer surfaces of the tubular bodies 13 and 14 and their adjacent inner ends. The spacer rings 23 may retain the annular sleeve member 20 in the desired radially spaced, coaxial position in relation to the tubular bodies 13 and 14 during casting of the material 22 in the spacing 18 and the annular space 21. In the embodiment shown in FIG. 2 the casting material may be introduced into the spacing 18 through the inner passage of the tubular body 13 or 14, and the material may be introduced into the annular space 21 from both ends thereof.

FIG. 3 shows an embodiment in which spacer rings 23 are arranged at the outer ends of the sleeve member 20. This sleeve member is provided with an injection opening 24 through which the casting material 22 may be injected into the space defined by the bodies 13 and 14, the tape or sheet material 19, the sleeve member 20, and by the spacer rings 23, by means of a syringe or another injection device 25. The embodiment shown in FIG. 4 substantially corresponds to that illustrated in FIG. 1. However, in FIG. 4 the inner surface of the sleeve member 20 and the outer surface of the tubular bodies 13 and 14 are provided with projections, such as bosses 26 and/or annular ridges 27 for causing an improved interconnection between the body 22 on one side and the sleeve member 20 and the tubular bodies 13 and 14 on the other.

The resistivity of the DSP matrix is illustrated in the Example:

MATERIALS USED IN THE EXAMPLE

White Portland cement: Specific surface (Blaine) 4380 cm$^2$/g Density (expected) 3.15 g/cm$^2$ Silica dust: Fine spherical SiO$_2$-rich dust. Specific surface (determined by BET technique) about 250,000 cm$^2$/g, corresponding to an average particle diameter of 0.1 μm. Density 2.22 g/cm$^3$.

Mighty: A so-called concrete superplasticizer, sodium salt of a highly condensed naphthalene sulphonic acid/formaldehyde condensate, of which typically more than 70% consist of molecules containing 7 or more naphtalene nuclei. Density about 1.6 g/cm$^3$. Available either as a solid powder or as an aqueous solution (42% by weight of Mighty, 58% by weight of water).

Water: Common tap water.

EXAMPLE

Two different mortar mixes were prepared, both on the basis of white Portland cement, silica dust and Mighty.

The composition of the mixes was as follows:

|  |  | Mix 1 | Mix 2 |
|---|---|---|---|
| White Portland cement |  | 2706 g | 2706 g |
| Quartz sand | 1–4 mm | 2763 g | 2763 g |
|  | 0.25–1 mm | 1380 g | 1380 g |
|  | 0–0.25 mm | 693 g | 693 g |
| Silica dust |  | 645 g | 645 g |
| 42% Mighty solution |  | 195 g | 195 g |
| Water |  | 387 g | 487 g |
| Ratio water: (cement + silica dust) |  | 0.15 | 0.18 |

Mixing.

The mixing was performed in a kneading machine with planetary movement using a mixing blade. The following procedure was followed:

(1) Dry mixing of sand, cement+silica dust for 5 minutes, (2) Addition of the major proportion of the water and continued mixing for 5 minutes (3) Addition of the Mighty solution and mixing for 10–20 minutes with addition of the remainder of the water.

For resistivity measurement, samples were cast in polyethylene boxes of dimensions approximately 11×9×7 cm with two embedded electrodes of steel wire mesh of dimensions approximately 1.5×1.5 cm and with 1.5 cm between the parallel electrodes.

Resistivities were measured with AC at 1 kHz which was shown to be appropriate. The electrode arrangement was calibrated in a box of the same dimensions filled with water of known resistivity so the specific resistivity in Ω.cm could be calculated from the measured resistance. The specimens were cured in water at several different temperatures, and the following resistivities were measured:

|  | Resistivity, in Ω · cm, at | | |
|---|---|---|---|
|  | 25° C. | 40° C. | 50° C. |
| After 25 days | 70,000 | 1,000,000 | 700,000 |
| After 100 days | 1,000,000 | 1,200,000 | 830,000 |

| Resistivity, in Ω · cm, at | | |
|---|---|---|
| 25° C. | 40° C. | 50° C. |
|  | 2,000,000* | 2,000,000* |

*measured at 24° C.

I claim:

1. A method of protecting a steel article against corrosion by being completely or partially coating it with a material showing resistivity of at least about 0.1 MΩcm and comprising a coherent binder matrix which comprises:
   (A) homogeneously arranged inorganic solid particles of a size of from about 50 Å to about 0.5 μm, or a coherent structure formed from such homogeneously arranged particles, and
   (B) densely packed solid particles having a size of the order of about 0.5–100 μm and being at least one order of magnitude larger than the respective particles stated under (A), or a coherent structure formed from such densely packed particles; the particles A or the coherent structure formed therefrom being homogeneously distributed in the void volume between the particles B, the dense packing being substantially a packing corresponding to the one obtainable by gentle mechanical influence on a system of geometrically equally shaped large particles in which locking surface forces do not have any significant effect;
   the particles A being substantially densely packed in the voids between densely packed particles B and being present in a volume of 5–50% by volume, calculated on the combined volume of the particles A+B; the particles B comprising Portland cement particles conferring corrosion protection to the steel due to the alkaline nature of the hardened Portland cement.

2. A method as claimed in claim 1 wherein the particles A are present in a volume of 10–30% by volume, calculated on the combined volume of the particles A+B.

3. A method as claimed in claim 2, wherein the particles A are ultrafine silica particles having a specific surface area of about 50,000–2,000,000 cm$^2$/g.

4. A method as claimed in claim 3 wherein the resistivity of the material is at least 0.3 MΩcm.

5. A method as claimed in claim 4 wherein the resistivity of the material is in the range of 1–10 MΩcm.

6. A steel article protected against corrosion by being completely or partially coated with a material showing resistivity of at least about 0.1 MΩcm and comprising a coherent binder matrix which comprises:
   (A) homogeneously arranged inorganic solid particles of a size of from about 50 Å to about 0.5 μm, or a coherent structure formed from such homogeneously arranged particles, and
   (B) densely packed solid particles having a size of the order of about 0.5–100 μm and being at least one order of magnitude larger than the respective particles stated under (A), or a coherent structure formed from such densely packed particles; the particles A or the coherent structure formed therefrom being homogeneously distributed in the void volume between the particles B, the dense packing being substantially a packing corresponding to the one obtainable by gentle mechanical influence on a system of geometrically equally shaped large particles in which locking surface forces do not have any significant effect;

the particles A being substantially densely packed in the voids between densely packed particles B and being present in a volume of 5–50% by volume, calculated on the combined volume of the particles A+B; the particles B comprising Portland cement particles conferring corrosion protection to the steel due to the alkaline nature of the hardened Portland cement; said steel article being in galvanic contact with a sacrificial anode material or by an impressed current so as to receive cathodic protection.

* * * * *